(12) United States Patent
Sahbari et al.

(10) Patent No.: US 11,999,894 B1
(45) Date of Patent: Jun. 4, 2024

(54) MIXTURE AND METHOD FOR FIRE SUPPRESSION AND PREVENTION

(71) Applicants: Shawn Sahbari, Morgan Hill, CA (US); Juan Garza, Morgan Hill, CA (US); Javad Sahbari, Morgan Hill, CA (US)

(72) Inventors: Shawn Sahbari, Morgan Hill, CA (US); Juan Garza, Morgan Hill, CA (US); Javad Sahbari, Morgan Hill, CA (US)

(*) Notice: Subject to any disclaimer, the term of this patent is extended or adjusted under 35 U.S.C. 154(b) by 0 days.

(21) Appl. No.: 17/856,725

(22) Filed: Jul. 1, 2022

Related U.S. Application Data

(60) Provisional application No. 63/217,282, filed on Jul. 1, 2021, provisional application No. 63/217,278, filed on Jul. 1, 2021, provisional application No. 63/217,277, filed on Jul. 1, 2021, provisional application No. 63/217,284, filed on Jul. 1, 2021, provisional application No. 63/217,279, filed on Jul. 1, 2021.

(51) Int. Cl.
  *A62D 1/06* (2006.01)
  *C09K 21/02* (2006.01)
  *C09K 21/04* (2006.01)
  *C09K 21/10* (2006.01)

(52) U.S. Cl.
  CPC .............. *C09K 21/04* (2013.01); *C09K 21/02* (2013.01); *C09K 21/10* (2013.01)

(58) Field of Classification Search
  CPC ......... C09K 21/04; C09K 21/02; C09K 21/10
  See application file for complete search history.

(56) References Cited

U.S. PATENT DOCUMENTS

| | | | | |
|---|---|---|---|---|
| 3,540,874 A | * | 11/1970 | Stinson | C05B 13/06 71/34 |
| 3,551,162 A | * | 12/1970 | Lapham, Jr. | A23K 50/15 426/74 |

(Continued)

FOREIGN PATENT DOCUMENTS

| | | | |
|---|---|---|---|
| CN | 105174237 B | * | 3/2018 |
| KR | 2020000819 A | * | 1/2020 |

OTHER PUBLICATIONS

CN 104229764 A, English Language Abstract. (Year: 2014).*
CN 112250505 A, English Language Abstract. (Year: 2021).*
CN 109928806 A, English Language Abstract. (Year: 2019).*

*Primary Examiner* — Joseph D Anthony
(74) *Attorney, Agent, or Firm* — Garvey Adam LLP; Joshua A. Schaul

(57) ABSTRACT

A method for creating a mixture for fire prevention and suppression, comprising introducing phosphoric acid and anhydrous ammonia gas into a reactor, then introducing urea into the reactor in a controlled rate to achieve a pH of the mixture is 7+/−0.1. Next amino functionalized siloxane is introduced into the mixture, and then powdered volcanic ash (pumice) is introduced. The powdered volcanic ash is introduced into the mixture by means of a turbo-shear high performance mixer. The resulting URAP can be sprayed as fire prevention coating onto vegetation, structural buildings, lumber material and/or other combustible structures. The URAP mixture performs as a fire suppressant by coating substrates and starving combustion's necessary oxygen access.

9 Claims, 3 Drawing Sheets

(56) References Cited

U.S. PATENT DOCUMENTS

| | | | | |
|---|---|---|---|---|
| 4,134,750 A | * | 1/1979 | Norton | C05B 7/00 |
| | | | | 423/313 |
| 4,292,067 A | * | 9/1981 | Stinson | C05B 13/06 |
| | | | | 423/306 |
| 4,601,891 A | * | 7/1986 | McGill | C01B 25/405 |
| | | | | 71/34 |
| 4,604,126 A | * | 8/1986 | Moraillon | C05B 7/00 |
| | | | | 71/36 |
| 4,789,391 A | * | 12/1988 | Detroit | C08F 289/00 |
| | | | | 71/64.11 |
| 6,905,639 B2 | | 6/2005 | Vandersall et al. | |
| 10,960,250 B2 | | 3/2021 | Hulbert et al. | |
| 2002/0178772 A1 | * | 12/2002 | Hince | C05G 5/14 |
| | | | | 71/31 |
| 2015/0043973 A1 | * | 2/2015 | Cannock | B09C 1/08 |
| | | | | 405/128.5 |
| 2020/0102498 A1 | * | 4/2020 | Bozkurt | C09K 17/50 |

\* cited by examiner

MIXTURE AND METHOD FOR FIRE SUPPRESSION AND PREVENTION

CROSS-REFERENCE TO RELATED APPLICATION

This patent application claims priority to U.S. Provisional Patent Applications Ser. Nos. 63/217,277, 63/217,278, 63/217279, 63/217,282 and 63/217,284, filed Jul. 1, 2021, the disclosure of which are incorporated herein by reference in their entirety.

BACKGROUND

Up until now, there has not been technology that would be preventive in fighting fires. Existing products on the market are based on reactive response to wildfires such as retardants and extinguishing suppressants. Conventional firefighting techniques have been limited to firefighters battling in the frontlines with controlled burns, digging trenches with tractors, to stop a fire line from reaching an area, using chainsaws, hoes and other mechanical means to physically alter the fire behavior, and using standard red-dye retardant in air tankers to dump large loads while aircraft are flying at altitude with a one-shot bulls-eye approach.

Wildfires continue to get larger and larger resulting in billions of dollars, and ecological loss and large amounts of money to maintain equipment to fight the fire. Legacy methods are ineffective and fail to scale along with the duration of fires that continue to swell year over year.

Current chemicals used today in fire prevention and/or suppression are based on ammonium phosphates salts, they do not start with high purity orthophosphoric acid and there is no addition of urea.

BRIEF SUMMARY

One or more embodiments relate to formation of non-limiting specialty chemicals for fire/wildfire prevention and suppression, comprising a controlled reaction of anhydrous ammonia, orthophosphoric acid and urea to create an octagonal crystal, urea-ammonium phosphate (URAP). In an embodiment, URAP has a neutral pH of 7 and provides more $N_2$ and $P_2O_5$ to fight fires over conventional fire suppression methods. In an embodiment of the invention, a carbon atom from the urea oxidizes to form $CO_2$ which by itself is an effective fire suppressant.

These and other features, aspects and advantages of the embodiments will become understood with reference to the following description, appended claims and accompanying figures.

DETAILED DESCRIPTION

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following description, numerous specific details are set forth, such as examples of specific percentages, components, etc., to provide a thorough understanding of the embodiments. It will be apparent, however, to one of ordinary skill in the art that the present design can be practiced without these specific details. In other instances, well known components or methods have not been described in detail but rather in a block diagram to avoid unnecessarily obscuring the present design. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

Figure 1:
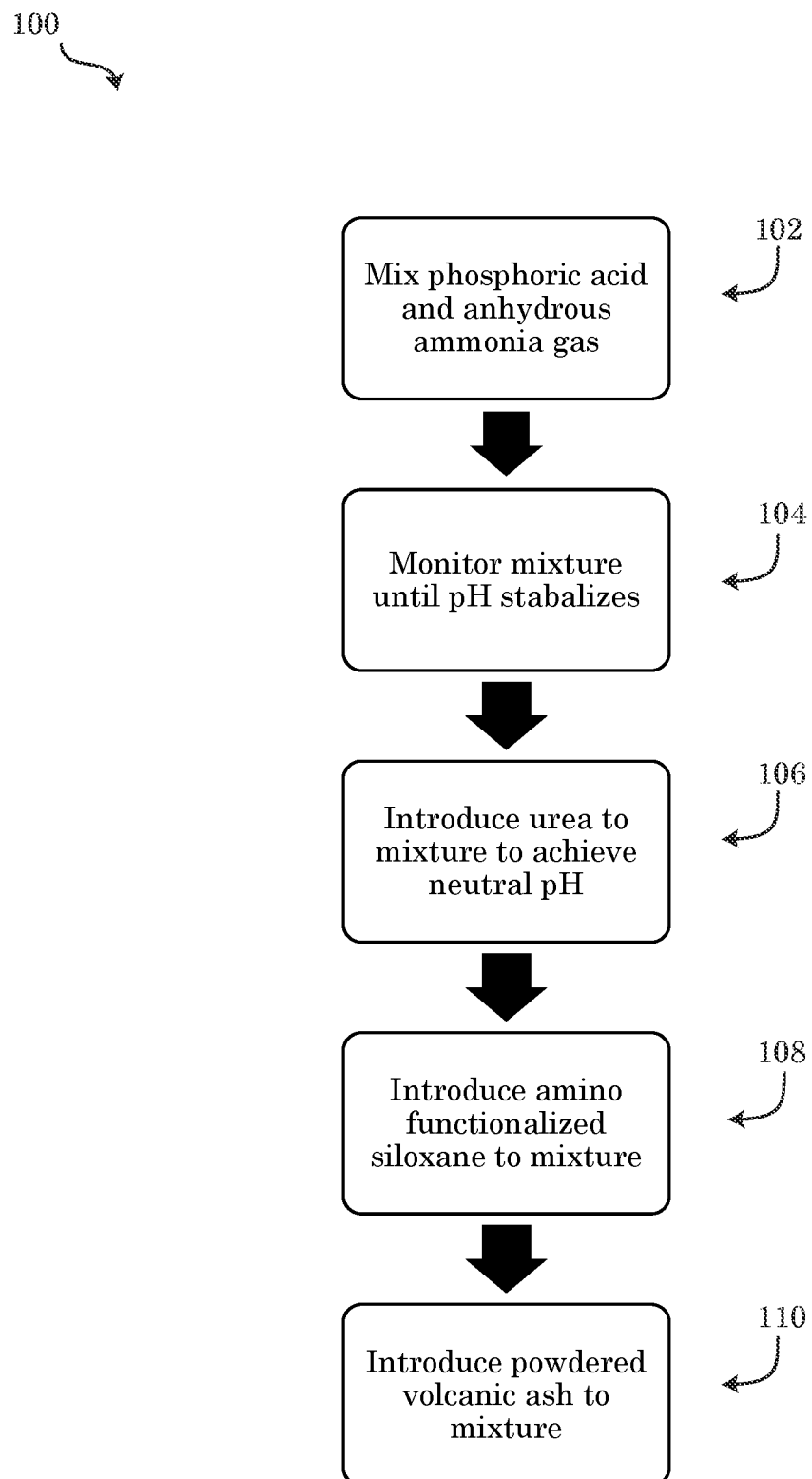
FIG. 1 illustrates a flow diagram for creating URAP, according to an embodiment.

Referring now to the drawings, FIG. 1 illustrates a flow diagram 100 for creating URAP, in accordance with one embodiment. The method 100 begins with block 102 where high purity phosphoric acid is mixed with anhydrous ammonia gas. In one embodiment, the phosphoric acid and anhydrous ammonia gas are introduced into a jacketed reactor in a balanced (i.e., controlled) manner to maintain a mixture with a pH in the range of 6.4 to 6.7. The resulting reaction is exothermic and will yield temperature of 200-400° Fahrenheit. After block 102, the method 100 continues to block 104 where the mixture is monitored until the pH stabilizes.

In an embodiment, block 104 involves the continuous monitoring and gradual metering of the mixture such that the pH does neither spikes or drops and instead stabilizes in the 6-7 range. In one embodiment the metering is accomplished by further introduction of small amounts of phosphoric acid and/or anhydrous ammonia gas. Once the mixture's pH remains within the range of 6.4-6.7, block 104 is complete and the method 100 continues to block 106 where urea is introduced to the mixture.

In one embodiment, both the mixture's reaction temperature and pH are controlled by introducing urea to the reaction vessel in balanced (i.e., controlled) manor to achieve a neutral pH of 7+/−0.1 (pH=6.9-7.1). Addition of urea aids in the cooling the mixture as well as further adjusting the pH to 7+/−0.1. In an embodiment, the amount of urea introduced into the mixture is between 1% to 15% weight per volume. In another embodiment, the amount of urea introduced into the mixture ranges from 5% to 12% weight per volume, and more specifically from 8% to 12%.

At the conclusion of block 106, the resulting mixture eliminates the need for toxic and/or otherwise corrosion inhibitors conventionally required for aircraft, ground spraying equipment and process pumping for fire retardant applications. Moreover, the mixture's neutral pH makes for a non-irritating and safe product for incidental and/or accidental human/animal contact. Further, the lower temperature allows for the introduction of amino functionalized siloxane (block 108) without risk of coagulation, settling, or other pH shock damaging mixture. After completion of block 106, the method 100 continue to block 108 where amino functionalized siloxane is introduced into the mixture.

In one embodiment, the amount of amino functionalized siloxane introduced in block 108 is between 0.1% to 15% weight per volume. In another embodiment, the amount is between 2% to 5% of amino functionalized siloxane weight per volume. In one embodiment, the amino functionalized siloxane is prepared from poly dimethyl siloxane PDMS with variable molecular weight. Once block 108 is complete, the method 100 continues with block 110 where powdered volcanic ash is introduced to the mixture.

In one embodiment, introduction of powdered volcanic ash (i.e., pumice) at block 110 is achieved by means of a turbo-shear high performance mixing system to create an optimum viscosity of the mixture. The volcanic ash behaves as a porous media to preserve and adsorb the siloxane liquid glass (result of block 108) so it can be released during a fire as a fire preventing agent. In one embodiment, the amount of volcanic ash introduced in block 110 is between 1% to 15% weight per volume. In another embodiment, the amount is between 5% to 10% of volcanic ash weight per volume.

The inert nature of volcanic ash (pumice) makes it a suitable conformal material for fire retardant formulations since there is no organic matter, silicates and/or oxides act as a coating (barrier shield) for approaching fires. Further, the volcanic ash's high surface area and porogen technology traps and holds (i.e., contains or encapsulates) the active ingredients of the URAP mixture in place for a triggered and/or timed release in the presence of fire and/or extreme heat.

Impregnation of the engineered volcanic ash (pumice) particles is made possible with the mixture having a neutral pH and use of the turbo-shear high performance mixing system to use mechanical energy and centrifugal forces to homogenize the final URAP. Standard mixing does not create the dispersion and suspended stable mixture required for commercial products. Further, the siloxane polymer bonds to pumice and forms chelates for stable commercial solutions with the silicon oxides, magnesium oxides, and other complex metal oxides (Al, Ti, Ca, Fe, Na, K).

At the conclusion of block 110 is the formation of a viscous URAP mixture that can be sprayed on as fire prevention coating onto vegetation, structural buildings, lumber material and/or other combustible structures. The viscous URAP mixture performs as a fire suppressant by coating substrates and starving combustion's necessary oxygen access. Moreover, the resulting URAP mixture is temperature stable for cold winter, and hot desert climates without freezing or phase separating.

Entrapped and encapsulated in the pumice micropores, the mixture provides superior long-term fire-retardant properties until fire and/or extreme heat releases $N_2$, $H_2O$, $CO_2$, $P_2O_5$, $SiO_2$, $Al_2O_3$, $MgO$ and other micro suppressants. In one embodiment, the combination of volcanic ash and siloxane polymers ensure the final viscosity of the URAP mixture has gel-like physical properties necessary for aerial drops of retardant and/or effective conformal coating of plants and other cellulosic materials.

Figure 2:
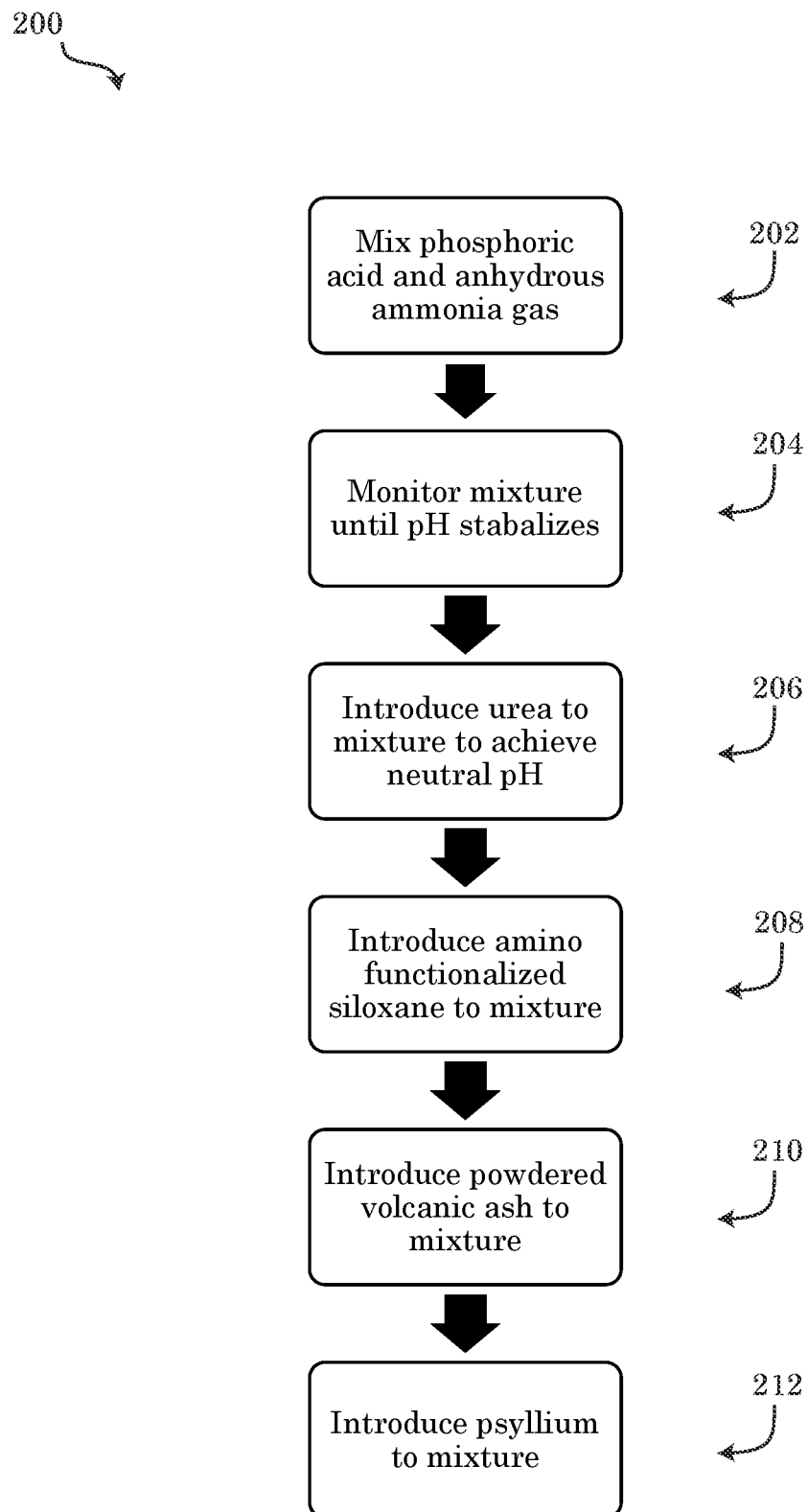
FIG. 2 illustrates a flow diagram for creating URAP+psyllium, according to an embodiment.

FIG. 2 illustrates a flow diagram 200 for creating URAP+psyllium, in accordance with one embodiment. The method 200 begins with block 202 where high purity phosphoric acid is mixed with anhydrous ammonia gas. In one embodiment, the phosphoric acid and anhydrous ammonia gas are introduced into a jacketed reactor in a balanced (i.e., controlled) manner to maintain a mixture with a pH in the range of 6.4 to 6.7. The resulting reaction is exothermic and will yield temperature of 200-400° Fahrenheit. After block 202, the method 200 continues to block 204 where the mixture is monitored until the pH stabilizes.

In an embodiment, block 204 involves the continuous monitoring and gradual metering of the mixture such that the pH does neither spikes or drops and instead stabilizes in the 6-7 range. In one embodiment the metering is accomplished by further introduction of small amounts of phosphoric acid and/or anhydrous ammonia gas. Once the mixture's pH remains within the range of 6.4-6.7, block 204 is complete and the method 200 continues to block 206 where urea is introduced to the mixture. In one embodiment, both the mixture's reaction temperature and pH are controlled by introducing urea to the reaction vessel in balanced (i.e., controlled) manor to achieve a neutral pH of 7+/−0.1 (pH=6.9-7.1). Addition of urea aids in the cooling the mixture as well as further adjusting the pH to 7+/−0.1. In an embodiment, the amount of urea introduced into the mixture is between 1% to 15% weight per volume. In another embodiment, the amount of urea introduced into the mixture ranges from 5% to 12% weight per volume, and more specifically from 8% to 12%.

At the conclusion of block 206, the resulting mixture eliminates the need for toxic and/or otherwise corrosion inhibitors conventionally required for aircraft, ground spraying equipment and process pumping for fire retardant applications. Moreover, the mixture's neutral pH makes for a non-irritating and safe product for incidental and/or accidental human/animal contact. Further, the lower temperature allows for the introduction of amino functionalized siloxane (block 208) without risk of coagulation, settling, or other pH shock damaging mixture. After completion of block 206, the method 200 continue to block 208 where amino functionalized siloxane is introduced into the mixture.

In one embodiment, the amount of amino functionalized siloxane introduced in block 208 is between 0.1% to 15% weight per volume. In another embodiment, the amount is between 2% to 5% of amino functionalized siloxane weight per volume. In one embodiment, the amino functionalized siloxane is prepared from poly dimethyl siloxane PDMS with variable molecular weight. Once block 208 is complete, the method 200 continues with block 210 where powdered volcanic ash is introduced to the mixture.

In one embodiment, introduction of powdered volcanic ash (i.e., pumice) at block 210 is achieved by means of a turbo-shear high performance mixing system to create an optimum viscosity of the mixture. The volcanic ash behaves as a porous media to preserve and adsorb the siloxane liquid glass (result of block 208) so it can be released during a fire as a fire preventing agent. In one embodiment, the amount of volcanic ash introduced in block 210 is between 1% to 15% weight per volume. In another embodiment, the amount is between 5% to 10% of volcanic ash weight per volume. Once block 210 is complete, the method 200 continues to block 212 where psyllium is introduced into the URAP mixture.

At block 212 of the method 200 psyllium is introduced into the URAP mixture to form URAP+psyllium. Psyllium is naturally resilient to water and so the enhanced fire prevention technology helps adhesion to plants and structures as well as helps with the longevity of the URAP mixture remaining on the vegetation and/or structures exposed to the elements. In fact, psyllium added to URAP mixture can provide upwards of 3-5 inches of rain protection without significant erosion of the fire protection properties the URAP mixture.

In an embodiment, the adhesion properties provided by introduction of psyllium to the URAP mixture resists falling/flaking off and/or washing off when applied to plant and/or structure surfaces. In an embodiment, algae, and various other sugar and starch-like compounds may be added to the URAP mixture to act as time release agents, adhesion promotors, and water proofing or weatherization compounds for use in exterior fire prevention formulations.

Figure 3:
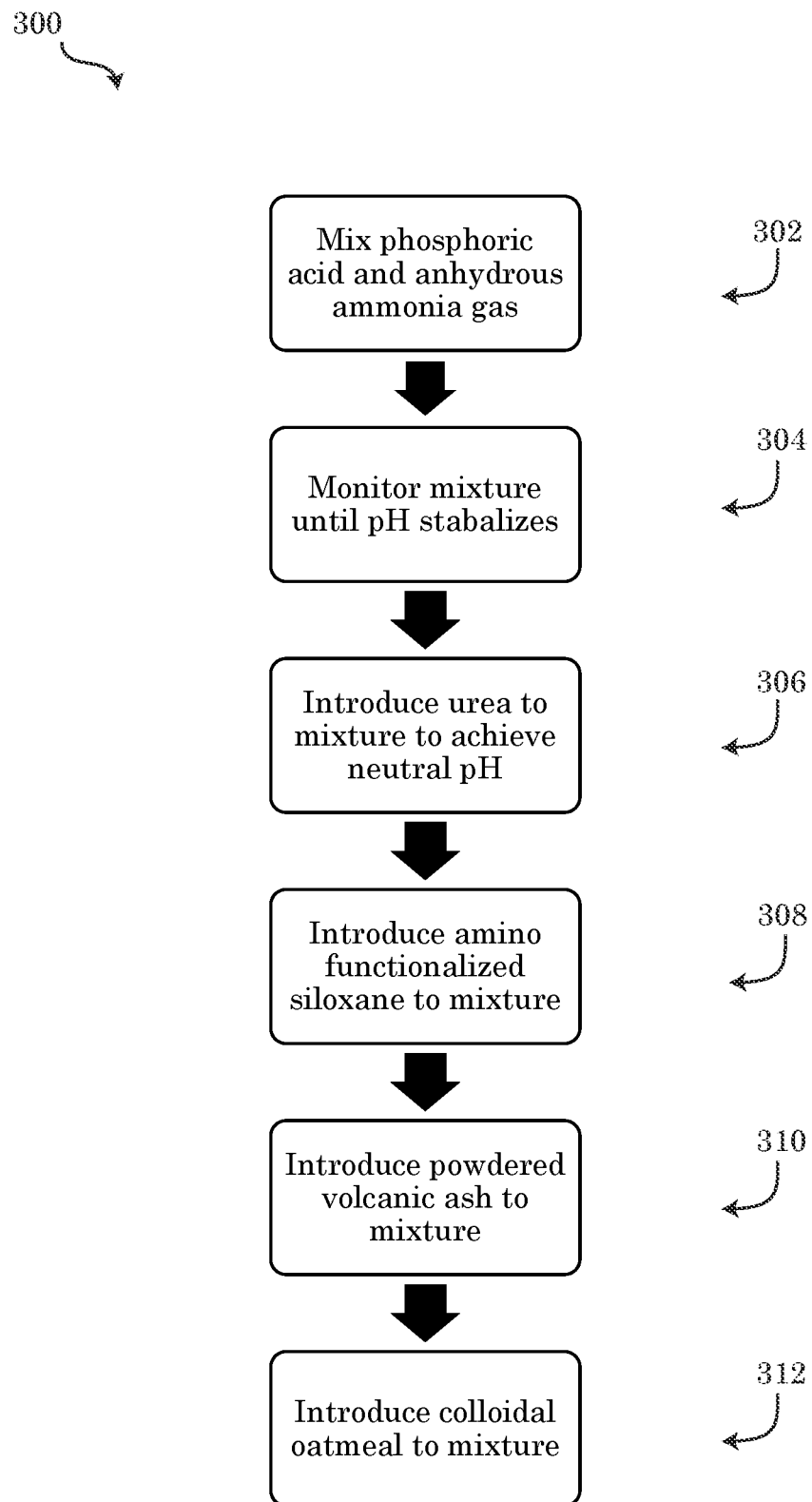
FIG. 3 illustrates a flow diagram for creating URAP+colloidal oatmeal, according to an embodiment.

FIG. 3 illustrates a flow diagram 300 for creating URAP+ colloidal oatmeal, in accordance with one embodiment. The method 300 begins with block 302 where high purity phosphoric acid is mixed with anhydrous ammonia gas. In one embodiment, the phosphoric acid and anhydrous ammonia gas are introduced into a jacketed reactor in a balanced (i.e., controlled) manner to maintain a mixture with a pH in the range of 6.4 to 6.7. The resulting reaction is exothermic and will yield temperature of 200-400° Fahrenheit. After block 302, the method 300 continues to block 304 where the mixture is monitored until the pH stabilizes.

In an embodiment, block 304 involves the continuous monitoring and gradual metering of the mixture such that the pH does neither spikes or drops and instead stabilizes in the 6-7 range. In one embodiment the metering is accomplished by further introduction of small amounts of phosphoric acid and/or anhydrous ammonia gas. Once the mixture's pH remains within the range of 6.4-6.7, block 304 is complete and the method 300 continues to block 306 where urea is introduced to the mixture. In one embodiment, both the mixture's reaction temperature and pH are controlled by introducing urea to the reaction vessel in balanced (i.e., controlled) manor to achieve a neutral pH of 7+/−0.1 (pH=6.9-7.1). Addition of urea aids in the cooling the mixture as well as further adjusting the pH to 7+/−0.1. In an embodiment, the amount of urea introduced into the mixture is between 1% to 15% weight per volume. In another embodiment, the amount of urea introduced into the mixture ranges from 5% to 12% weight per volume, and more specifically from 8% to 12%.

At the conclusion of block 306, the resulting mixture eliminates the need for toxic and/or otherwise corrosion inhibitors conventionally required for aircraft, ground spraying equipment and process pumping for fire retardant applications. Moreover, the mixture's neutral pH makes for a non-irritating and safe product for incidental and/or accidental human/animal contact. Further, the lower temperature allows for the introduction of amino functionalized siloxane (block 308) without risk of coagulation, settling, or other pH shock damaging mixture. After completion of block 306, the method 300 continue to block 308 where amino functionalized siloxane is introduced into the mixture.

In one embodiment, the amount of amino functionalized siloxane introduced in block 308 is between 0.1% to 15% weight per volume. In another embodiment, the amount is between 2% to 5% of amino functionalized siloxane weight per volume. In one embodiment, the amino functionalized siloxane is prepared from poly dimethyl siloxane PDMS with variable molecular weight. Once block 308 is complete, the method 300 continues with block 310 where powdered volcanic ash is introduced to the mixture.

In one embodiment, introduction of powdered volcanic ash (i.e., pumice) at block 310 is achieved by means of a turbo-shear high performance mixing system to create an optimum viscosity of the mixture. The volcanic ash behaves as a porous media to preserve and adsorb the siloxane liquid glass (result of block 308) so it can be released during a fire as a fire preventing agent. In one embodiment, the amount of volcanic ash introduced in block 310 is between 1% to 15% weight per volume. In another embodiment, the amount is between 5% to 10% of volcanic ash weight per volume. Once block 310 is complete, the method 300 continues to block 312 where colloidal oatmeal is introduced into the URAP mixture.

At block 312 of the method 300 colloidal oatmeal is introduced into the URAP mixture to form URAP+colloidal oatmeal. In an embodiment, the colloidal oatmeal acts as an effective adhesive material which has the effect of making the product matrix stick and/or adhere to vegetation and other surfaces when sprayed and/or disbursed. In an embodiment, given the starch and sticky nature of oatmeal, once dried the resulting URAP+colloidal oatmeal mixture will remain intact on the plant, vegetation or various cellulosic surfaces until heat resulting from an encroaching fire/wildfire releases it to extinguish and/or suppress the fire. Moreover, colloidal oatmeal is naturally resilient to water and so the enhanced fire prevention technology of URAP+colloidal oatmeal helps adhesion and helps with the longevity of the mixture remaining on the vegetation exposed to the elements. Stable viscosity, adhesion and resistance to moderate amounts of water moisture create a robust solution for wildfire prevention.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method for creating a mixture for fire prevention and suppression, comprising:
   introducing phosphoric acid and anhydrous ammonia gas into a reactor;
   monitoring the mixture until a pH for the mixture stabilizes between 6.4 to 6.7;
   introducing urea into the mixture wherein the pH of the mixture is 7+/−0.1;
   introducing amino functionalized siloxane into the mixture;
   introducing powdered volcanic ash into the mixture; and
   introducing colloidal oatmeal into the mixture;
   wherein the powdered volcanic ash is introduced into the mixture by means of a turbo-shear high performance mixer.

2. The method of claim 1, wherein:
an amount of the urea introduced into the mixture is between 1% to 15% weight per volume.

3. The method of claim 1, wherein:
an amount of the urea introduced into the mixture is between 5% to 12% weight per volume.

4. The method of claim 1, wherein:
an amount of the amino functionalized siloxane introduce into the mixture is between 0.1% to 15% weight per volume.

5. The method of claim 1, wherein:
an amount of the amino functionalized siloxane introduce into the mixture is between 2% to 5% weight per volume.

6. The method of claim 1, wherein:
an amount of the volcanic ash introduced into the mixture is between 1% to 15% weight per volume.

7. The method of claim 1, wherein:
an amount of the volcanic ash introduced into the mixture is between 5% to 10% weight per volume.

8. A mixture for fire prevention and suppression, comprising:
phosphoric acid, anhydrous ammonia gas, urea, amino functionalized siloxane, powdered volcanic ash and colloidal oatmeal;
wherein a pH of the mixture is 7+/−0.1;
wherein an amount of the urea introduced into the mixture is between 1% to 15% weight per volume;
wherein an amount of the amino functionalized siloxane introduce into the mixture is between 0.1% to 15% weight per volume; and
wherein an amount of the volcanic ash introduced into the mixture is between 1% to 15% weight per volume.

9. A method for creating a mixture for fire prevention and suppression, comprising:
introducing phosphoric acid and anhydrous ammonia gas into a reactor;
introducing urea into the mixture;
introducing amino functionalized siloxane into the mixture;
introducing powdered volcanic ash into the mixture;
introducing colloidal oatmeal into the mixture;
wherein the powered volcanic ash is introduced by means of a turbo-shear high performance mixer;
wherein a pH of the mixture is 7+/−0.1;
wherein an amount of the urea in the mixture is between 5% to 12% weight per volume;
wherein an amount of the amino functionalized siloxane in the mixture is between 2% to 5% weight per volume; and
wherein an amount of the volcanic ash in the mixture is between 5% to 10% weight per volume.

* * * * *